United States Patent
Pichler

(10) Patent No.: US 9,750,277 B2
(45) Date of Patent: Sep. 5, 2017

(54) PRESS FOR CITRUS FRUITS

(71) Applicant: T M P Technic-Marketing-Products GMBH, Linz (AT)

(72) Inventor: Josef Pichler, Alberndorf (AT)

(73) Assignee: T M P Technic-Marketing-Products GMBH, Linz (AT)

( * ) Notice: Subject to any disclaimer, the term of this patent is extended or adjusted under 35 U.S.C. 154(b) by 0 days.

(21) Appl. No.: 14/773,612

(22) PCT Filed: Aug. 11, 2014

(86) PCT No.: PCT/AT2014/050173
§ 371 (c)(1),
(2) Date: Sep. 8, 2015

(87) PCT Pub. No.: WO2015/024034
PCT Pub. Date: Feb. 26, 2015

(65) Prior Publication Data
US 2016/0037821 A1     Feb. 11, 2016

(30) Foreign Application Priority Data
Aug. 22, 2013 (AT) .............................. A 50518/2013

(51) Int. Cl.
*A23N 1/00* (2006.01)
*A23N 1/02* (2006.01)

(52) U.S. Cl.
CPC .............. *A23N 1/003* (2013.01); *A23N 1/02* (2013.01)

(58) Field of Classification Search
CPC .................................. A23N 1/02; A23N 1/003

USPC ...... 99/495, 502, 504, 507, 510; 100/37, 97, 100/98 R, 107, 112, 208, 213
See application file for complete search history.

(56) References Cited

U.S. PATENT DOCUMENTS

| 2,311,565 | A |   | 2/1943 | Nelson |
|---|---|---|---|---|
| 2,522,800 | A |   | 9/1950 | Quiroz |
| 2,707,981 | A | * | 5/1955 | Trainor .................. A23N 1/003 100/147 |

(Continued)

FOREIGN PATENT DOCUMENTS

WO     2013/038039 A1     3/2013

OTHER PUBLICATIONS

International Search Report of PCT/AT2014/050173, mailed Dec. 10, 2014.

*Primary Examiner* — Thien S Tran
(74) *Attorney, Agent, or Firm* — Collard & Roe, P.C.

(57) ABSTRACT

A press for citrus fruits has a press head, which executes a press stroke and includes two accommodating dies, each for one fruit half. The dies are arranged on either side of a blade and are pivoted in opposite directions via parallel shafts between an upper accommodating position and a lower pressing position. Rams are assigned to the press head and interact with the dies in the lower pressing position A discharging device for discharging the skins of the pressed fruit halves. Includes a comb whose fingers engage in grooves of the rams. The grooves are oriented in the direction of the parallel shafts. The comb is displaceable between a lower starting position, with fingers lowered in the grooves, and a discharging position, with fingers raised above the rams and sloping down toward the shafts to a discharging opening.

3 Claims, 4 Drawing Sheets

(56) References Cited

U.S. PATENT DOCUMENTS

| | | | | |
|---|---|---|---|---|
| 2,753,903 | A | * | 7/1956 | Allison .................. A23N 1/003 269/14 |
| 4,896,591 | A | | 1/1990 | Bertrand |
| 4,917,007 | A | * | 4/1990 | Nelson ..................... A23N 4/18 100/108 |
| 5,182,984 | A | * | 2/1993 | Wagner .................. A23N 1/003 100/108 |
| 5,188,021 | A | | 2/1993 | Bushman et al. |
| 5,445,067 | A | * | 8/1995 | Font ....................... A23N 1/003 99/502 |
| 6,234,071 | B1 | * | 5/2001 | Catarain Arregui ... A23N 1/003 99/501 |

\* cited by examiner

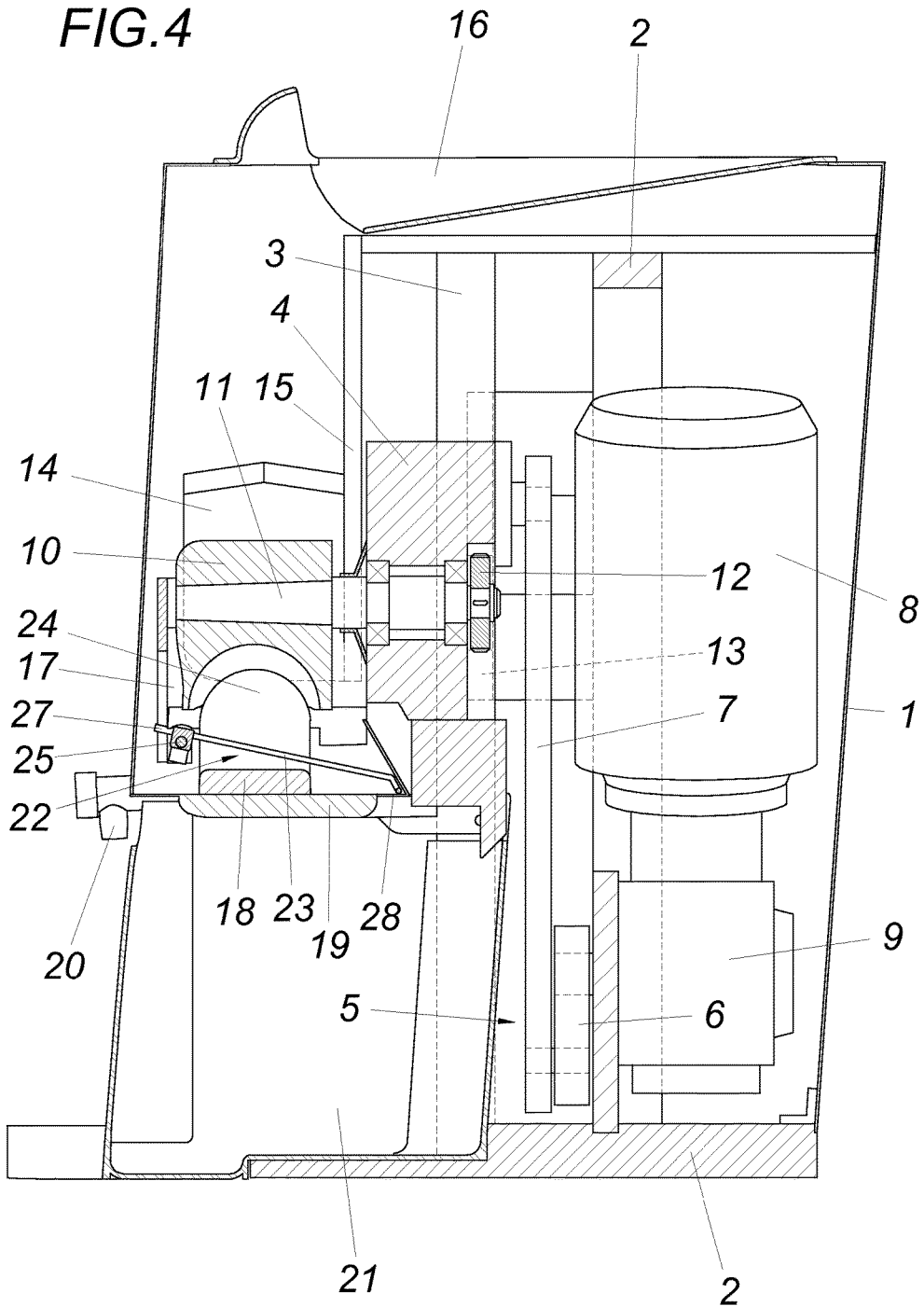

PRESS FOR CITRUS FRUITS

CROSS REFERENCE TO RELATED APPLICATIONS

This application is the National Stage of PCT/AT2014/050173 filed on Aug. 11, 2014, which claims priority under 35 U.S.C. §119 of Austrian Application No. A50518/2013 filed on Aug. 22, 2013, the disclosures of which are incorporated by reference. The international application under PCT article 21(2) was not published in English.

FIELD OF THE INVENTION

The invention relates to a press for citrus fruits, having a press head, which executes a press stroke and comprises two accommodating dies, each for one fruit half, which are arranged on either side of a blade and can be pivoted in opposite directions via parallel shafts between an upper accommodating position and a lower pressing position, and having rams which are assigned to the press head and interact with the accommodating dies in the lower pressing position, and having a discharging device for discharging the skins of the pressed fruit halves.

DESCRIPTION OF THE PRIOR ART

In the case of presses for fruits in which the press tools are formed from fixed lower rams and accommodating dies co-operating with said rams, which can be pivoted between an upper accommodating position for the fruit and a lower pressing position (WO 2013/038039 A1), constructional advantages are obtained concerning the overall width because the accommodating dies merely need to be pivoted back and forth in opposite directions between the accommodating position and the pressing position and need not revolve in opposite directions. During the downward pivoting of the accommodating dies to the pressing position, the citrus fruits are cut in half by means of a blade arranged between the accommodating dies, so that the fruit halves in the two accommodating dies are pressed in the lower pressing position against the rams so that they are squeezed out, which rams penetrate the accommodating dies. Due to the rigid bearing of the rams, special precautions need to be taken to discharge the skins of the pressed fruits to collecting containers. For this purpose, the rams are provided beneath access openings which are bridged by rubber-elastic bands, so that during the press stroke the fruit halves press the rubber-elastic bands against the rams. During the no-load stroke of the press head, these rubber bands are relieved and lift the pressed half skins from the rams via the access openings. The pressed half skins are discharged laterally into the collecting containers from the press region during the pivoting of the accommodating dies to the lower pressing position during the subsequent press stroke. Apart from the fact that the operational reliability depends on the function of the rubber-elastic belts, the advantage of such fruit presses concerning a low overall width is defeated by this discharge of the skins because the lateral discharging of the skin halves requires additional space in the direction of the overall width.

SUMMARY OF THE INVENTION

The invention is thus based on the object of providing a discharging device for the pressed skin halves for a fruit press of the kind mentioned above in such a way that no additional space that would extend the overall width is required for the discharge of the pressed skin halves.

This object is achieved by the invention such a way that the discharging device for the skins of the pressed fruit halves comprises a discharging comb, whose fingers engage in grooves which are located in the rams and are oriented in the direction of the shafts of the accommodating dies, and the discharging comb is displaceable between a lower starting position, with fingers lowered in the grooves of the rams, and a discharging position, with fingers raised above the rams and sloping down in the direction of the shafts to a discharging opening.

The pressing process of the skin halves is not obstructed by providing a discharging comb which can be lowered with its fingers into respective grooves of the ram. Instead, a precondition is provided to lift the pressed skin halves from the rams and to discharge them in a simple manner in the direction of the downwardly sloping fingers when the discharging comb is lifted from the grooves above the rams, so that the fingers form a discharging chute, along which the pressed skin halves are ejected into a collecting container. Since the fingers of the discharging comb are aligned in the direction of the shafts of the accommodating dies, such a discharging device does not lead to any increase in the size of the overall width. Although in principle a discharge to a front discharging opening is possible, better constructional conditions are obtained when the fingers in the discharging position slope downwardly to a rear discharging opening, i.e. a discharging opening which lies behind the rams with respect to the front side facing a user.

Since the press head comprising the accommodating dies performs a press stroke, said lifting movement can advantageously be used for the displacement of the discharging comb between its lower starting position and the upper discharging position. For this purpose, the discharging comb can be pivotably linked to the press head on the side of the ram facing away from the discharging opening about an articulated shaft which is perpendicular to the shafts of the accommodating dies. With the press stroke of the press head, the fingers of the discharging comb are lowered into the grooves of the rams to the starting position in order to be lifted subsequently to the discharging position during the subsequent no-load stroke. In order to ensure that overall height can be saved, the rams can be associated with a sliding limit stop for the discharging comb on the side facing the discharging opening, so that during the lowering to the starting position the discharging comb can be lifted against the press head under sliding along the sliding limit stop about its articulated shaft. The discharging comb assumes its downwardly sloping discharging position during the no-load stroke of the press head. The downwardly sloping discharging position of the discharging comb can be determined in a simple constructional manner in such a way that the press head comprises in the region of the articulated shaft for the discharging comb a rotating stop which determines the pivoting angle of the discharging comb for the discharging position. Said rotating stop can be formed in an adjustable manner if required in order to enable the adjustment of the inclination of the discharging comb to the respective discharging conditions of the citrus fruits.

BRIEF DESCRIPTION OF THE DRAWINGS

The subject matter of the invention is shown by way of example in the drawings, wherein:

FIG. 4 shows a sectional view along the line IV-IV of FIG. 3.

DESCRIPTION OF THE PREFERRED EMBODIMENT

Figure 1:
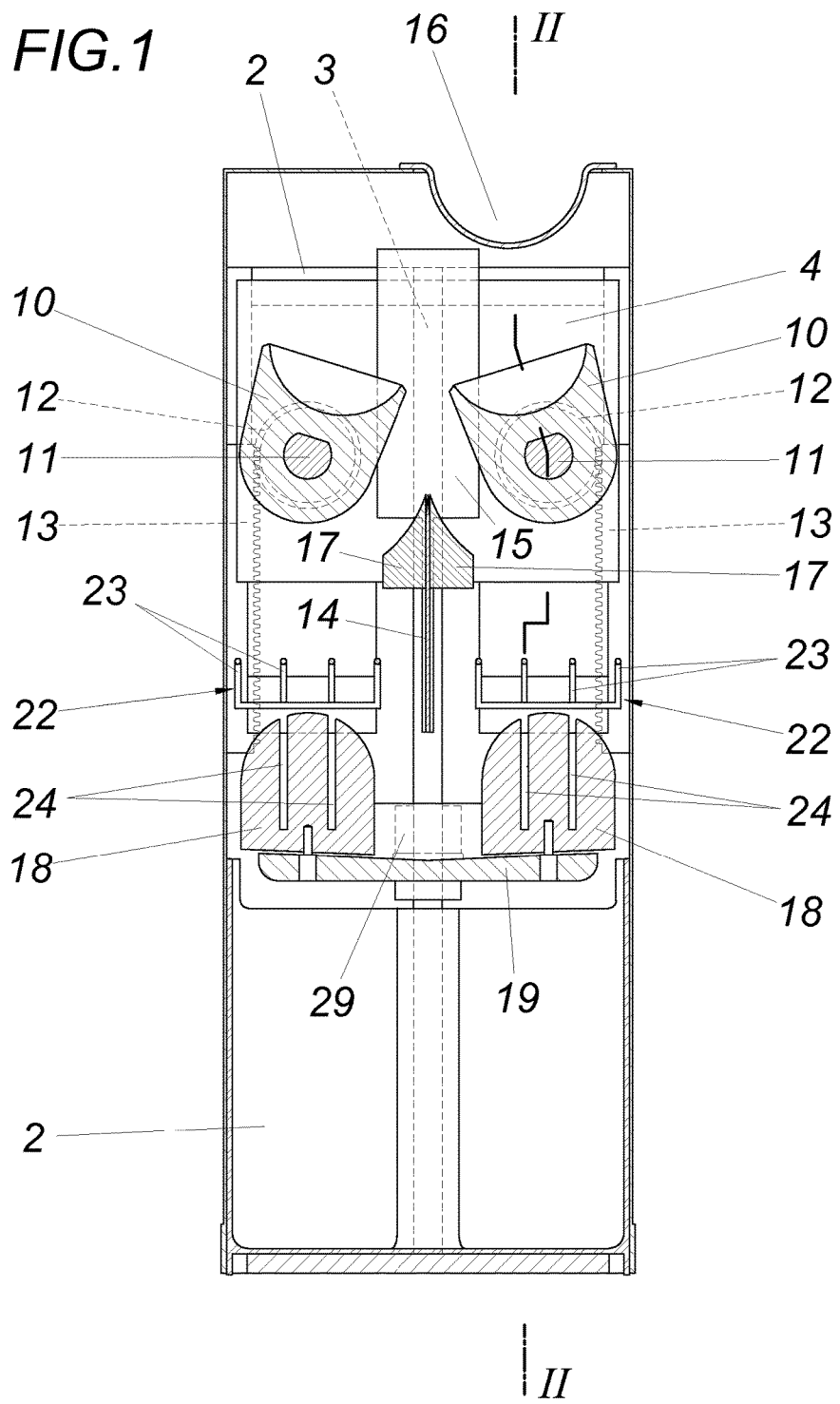
FIG. 1 shows a fruit press for citrus fruit in accordance with the invention in a sectional view perpendicularly to the shafts of the accommodating dies in the upper accommodating position of the accommodating dies.

The illustrated press for citrus fruit comprises a frame 2 which is enclosed by a housing 1 and forms a guide 3 extending along the height for a press head 4. Said press head 4 is driven along the guide 3 by means of a press drive 5, which is formed in accordance with the embodiment by a crank 6 and a pushrod 7 linked to the crank 6, which is not mandatory however. An electric motor 8 with connected bevel gear 9 is used for driving the press drive 5.

Two accommodating dies 10 are mounted in the press head 4 on parallel shafts 11 which carry a drive pinion 12. Said drive pinions 12 mesh with toothed racks 13 which are laterally fixed to the frame 2, so that during a displacement of the press head 4 along the guide 3 the drive pinions 12 rolling on the toothed racks 13 pivot the accommodating dies 10 during the press stroke from the upper accommodating position shown in FIG. 1 to the lower pressing position according to FIG. 3, and back to the accommodating position during the no-load stroke from the lower pressing position.

A blade 14 is fixed to the frame 2 between the two accommodating dies 10, which fixing occurs by means of a blade holder 15 engaging beyond press head 4. In order to ensure that the citrus fruits supplied via a feed channel 16 to the accommodating dies 10 are unable to slide out of the accommodating dies 10 as a result of gravity after the cutting during the retracting movement in opposite directions, sliding guides 17 for the fruit halves are associated with the accommodating dies 10 on the press head 13. Said sliding guides 17 form a guide for the blade 14 between themselves.

Figure 3:
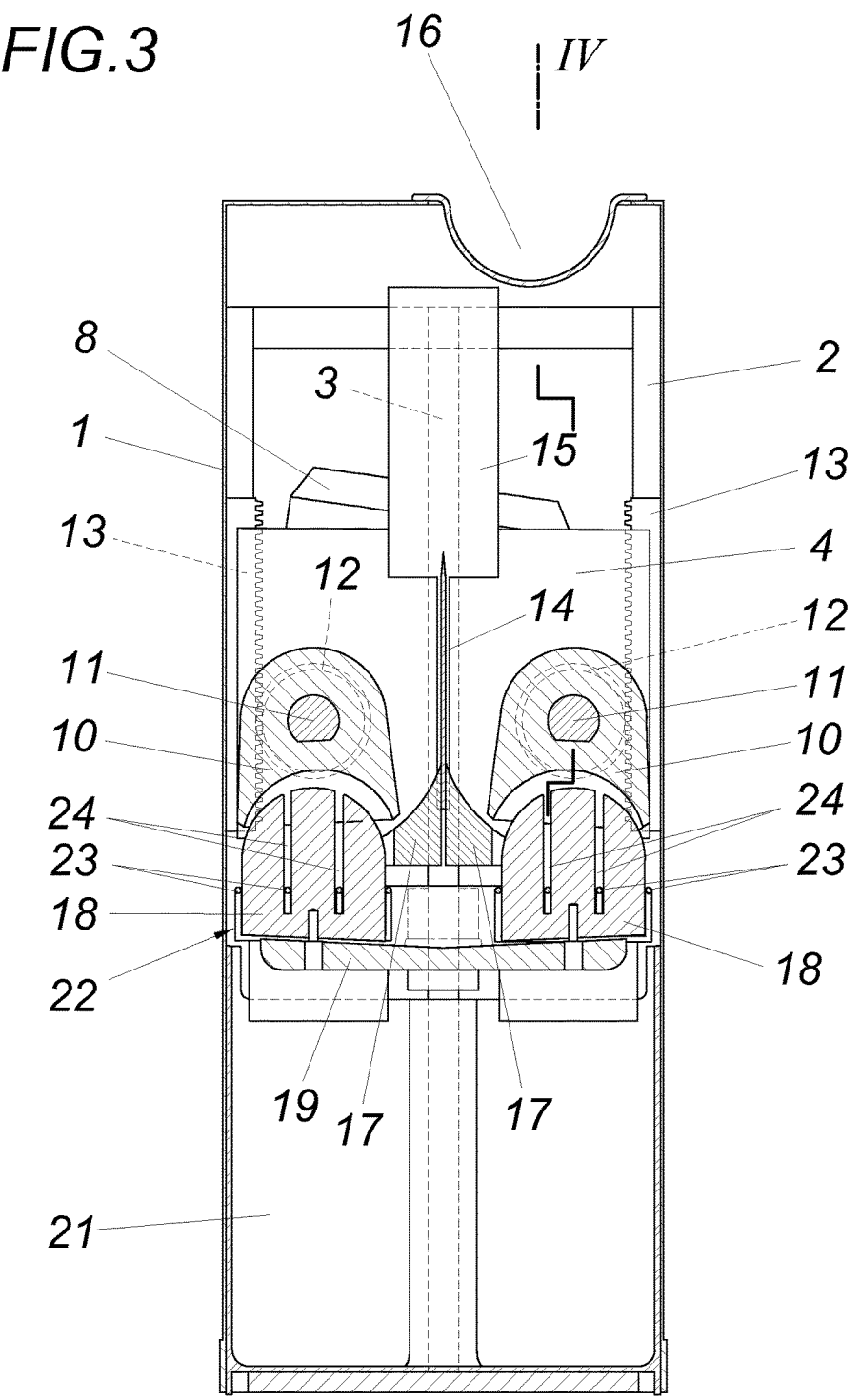
FIG. 3 shows a view of the fruit press corresponding to FIG. 1 with the accommodating dies in the lower pressing position.

Rams 18 are provided in the frame 2 beneath the accommodating dies 10, which rams cooperate with the accommodating dies 10 in the lower pressing position, as is shown in FIGS. 3 and 4. The support of the rams 18 is provided via a carrier 19, which is fixed in the embodiment to the guide 3, If the accommodating dies 10 which are loaded with the fruit halves are lowered during the press stroke of the press head 4 onto the rams 18, the fruit halves are pressed out between the rams 18 and the dies 10. The pressed juice is collected on a carrier 19 forming a discharge within a juice space and can be removed via a stopcock 20.

Figure 2:
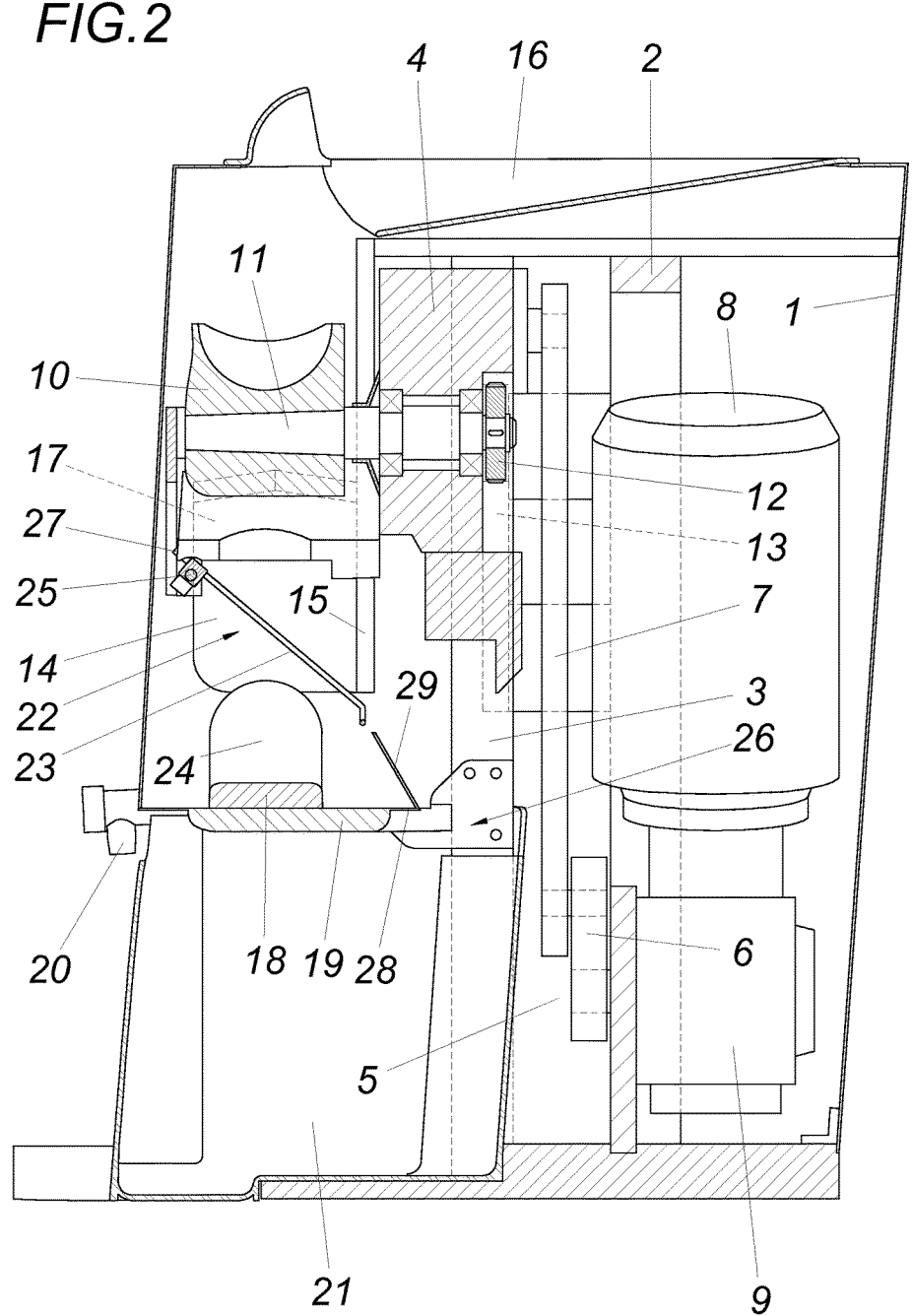
FIG. 2 shows a sectional view along the line II-II of FIG. 1.

In order to lift the pressed skins of the citrus fruit from the rams 18 and to discharge them to a collecting container 21 provided beneath the carrier 19, a discharging device is provided which is formed by a discharging comb 22 with parallel fingers 23. The rams 18 are provided with grooves 24 aligned in the direction of the shafts 11 of the accommodating dies 10 for the purpose of accommodating the fingers 23 of the discharging comb 22, which is linked to the press head 4 about an articulated shaft 25 which is perpendicular to the shafts 11 of the accommodating dies 10, namely beneath the sliding guides 17. Since the articulation of the discharging comb 22 is provided on the front side of the sliding guides 17 facing the user, the discharging comb 22 (in the lifted discharging position shown in FIG. 2) slopes downwardly to the rear towards a discharging opening 26 opening into the collecting container 21. This downwardly sloping discharging position to the rear is constructionally fixed by a rotating stop for the discharging comb 22. Said rotating stop can be formed in a simple manner by a limit stop end 27 of at least one finger 23 protruding beyond the articulated shaft 25, which finger cooperates with a counter limit stop on the sliding guide 17. In the lowered pressing position of the press head 4, the discharging comb 22 rests on a sliding limit stop 28 formed by the carrier 19, which limit stop—during the lowering of the press head 4—produces an upward pivoting of the discharging comb 22 about its articulated shaft 25 and thus saves overall height. In the lowered pressing position, the fingers 23 of the discharging comb 22 are sunk in the grooves 24 of the rams 18, so that the pressing of the fruit halves is not obstructed by the discharging device. If the press head 4 is lifted by the press drive 5 in a no-load stroke after the pressing, the discharging comb 22 is pivoted to the pivoting position of the discharging position which is limited by the limit stop, which pivoting occurs by entraining the skin halves remaining on the rams 18, and is lifted above the rams 18, so that the half skins slide along the downwardly sloping fingers 23 via a wall 29 limiting the juice space above the carrier 19 and drop into the collecting container 21.

The invention claimed is:

1. A press for citrus fruits, the press comprising:
   a blade,
   a press head executing a press stroke and comprising two accommodating dies and parallel shafts, each accommodating die for one fruit half, the two accommodating dies being arranged on either side of the blade and being pivoted in opposite directions via the parallel shafts between an upper accommodating position and a lower pressing position,
   rams assigned to the press head, interacting with the accommodating dies in the lower pressing position, and comprising grooves oriented in a direction of the parallel shafts of the press head, and
   a discharging device for discharging skin of pressed fruit halves, the discharging device comprising a discharging comb whose fingers engage in the grooves of the rams, the discharging comb
being displaceable between a lower starting position and a discharging position, in the lower starting position the fingers being lowered in the grooves of the rams, and in the discharging position the fingers being raised above the rams and sloping down in the direction of the parallel shafts to a discharging opening,
   wherein on a side of the rams facing away from the discharging opening, the discharging comb is pivotably linked to the press head about an articulated shaft, the articulated shaft being perpendicular to the parallel shafts of the press head.

2. A fruit press according to claim 1, wherein a sliding limit stop for the discharging comb is assigned to the rams on a side facing the discharging opening.

3. A fruit press according to claim 1, wherein in a region of the articulated shaft the press head comprises a rotating stop, the rotating stop determining a pivoting angle of the discharging comb for the discharging position.

* * * * *